(12) United States Patent
Baik (10) Patent No.: US 11,472,241 B2
(45) Date of Patent: Oct. 18, 2022

(54) TOWING APPARATUS FOR BUS

(71) Applicants: Hyundai Motor Company, Seoul (KR); Kia Motors Corporation, Seoul (KR)

(72) Inventor: Hyoung Kwon Baik, Jeonju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 142 days.

(21) Appl. No.: 16/998,738

(22) Filed: Aug. 20, 2020

(65) Prior Publication Data

US 2021/0331537 A1     Oct. 28, 2021

(30) Foreign Application Priority Data

Apr. 22, 2020  (KR) .......................... 10-2020-0048414

(51) Int. Cl.
*B60D 1/02* (2006.01)
*B60D 1/48* (2006.01)

(52) U.S. Cl.
CPC ............. *B60D 1/025* (2013.01); *B60D 1/488* (2013.01)

(58) Field of Classification Search
CPC .................................. B60D 1/02; B60D 1/025
See application file for complete search history.

(56) References Cited

U.S. PATENT DOCUMENTS

| | | | | | |
|---|---|---|---|---|---|
| 2,000,757 A | * | 5/1935 | Holczer | ................ | B60D 1/025 411/351 |
| 2,452,785 A | * | 11/1948 | Olney | ...................... | B60D 1/02 280/495 |
| 2,492,914 A | * | 12/1949 | Barden | .................... | B60D 1/02 280/163 |
| 3,175,453 A | * | 3/1965 | Williams | ................ | F16B 21/12 403/379.2 |
| 3,528,684 A | * | 9/1970 | Cowgill | ................... | B60D 1/02 280/505 |
| 3,865,407 A | * | 2/1975 | Klassen | ................... | B60D 1/02 280/515 |
| 3,998,472 A | * | 12/1976 | Tretter | ................... | B60D 1/025 280/515 |
| 4,073,507 A | * | 2/1978 | Dingess | ................... | B60D 1/02 280/487 |
| 2021/0188024 A1 | * | 6/2021 | Richards | ................ | A01B 59/00 |

FOREIGN PATENT DOCUMENTS

| | | | |
|---|---|---|---|
| DE | 3810360 A1 | * | 10/1989 |
| KR | 100774338 B1 | | 11/2007 |
| KR | 20130002549 U | * | 4/2013 |
| KR | 101794004 B1 | * | 12/2017 |

* cited by examiner

*Primary Examiner* — Kevin Hurley
(74) *Attorney, Agent, or Firm* — Slater Matsil, LLP (57) ABSTRACT

A towing apparatus includes a towing bracket configured to protrude rearward from a rear end frame which is disposed to extend in a left-right direction at a rearmost lower end of a vehicle body, and a towing pin assembly which is detachably assembled with the towing bracket and to which a towing mechanism provided in a towing vehicle is to be caught and coupled.

20 Claims, 5 Drawing Sheets

TOWING APPARATUS FOR BUS

CROSS-REFERENCE TO RELATED APPLICATIONS

The present application claims the benefit of Korean Patent Application No. 10-2020-0048414, filed on Apr. 22, 2020, which application is hereby incorporated herein by reference.

TECHNICAL FIELD

The present disclosure relates to a towing apparatus for a bus.

BACKGROUND

When a failure occurs such that a vehicle cannot drive, towing measures should be taken. To this end, a towing apparatus capable of hooking and fixing a tow hook or a tow band, which will be used when towing, is coupled to a front frame or a rear frame of the vehicle.

The towing apparatus provided in the vehicle should be configured in a structure capable of achieving a firm and reliable coupling and should further be configured in a structure in which a connected state is not separated due to a vibration or an impact. Therefore, for safety during towing, various conditions are specified as regulations.

Recently, the supply of low-floor buses (ultra-low-floor buses), which have improved convenience of passengers when getting into and out of the buses by lowering ground clearance of the buses, has increased.

In the case of the low-floor bus, a towing apparatus is coupled to a rear end frame located at a rear side of the low-floor bus. Since the towing apparatus is coupled in a structure protruding downward based on the rear end frame, when the low-floor bus crosses a bump or enters a hilly road during driving, the towing apparatus frequently comes into contact with the ground. Therefore, since an impact generated due to the contact is transferred to passengers, there is a disadvantage in that ride comfort is degraded, and particularly, a bonding force with the low-floor bus is weakened due to the impact generated due to the contact with the ground so that durability is degraded or damage occurs in severe cases.

The foregoing is intended merely to aid in the understanding of the background of the present disclosure, and is not intended to mean that the present disclosure falls within the purview of the related art that is already known to those skilled in the art.

SUMMARY

Accordingly, embodiments of the present disclosure solve problems occurring in the related art. The present disclosure relates to a towing apparatus for a bus. Particular embodiments relate to a towing apparatus for a bus, which is configured to prevent contact with the ground when crossing a bump or entering a hilly road during driving. Embodiments of the present disclosure provide a towing apparatus provided in a low-floor bus with a coupling structure, in which the towing apparatus protrudes rearward from a rear end frame, to be capable of preventing the towing apparatus from coming into contact with the ground when the low-floor bus crosses a bump or enters a hilly road during driving, thereby enhancing a coupling force between the towing apparatus and the low-floor bus, preventing damage to the towing apparatus, and achieving improvement of ride comfort of a passenger.

According to one aspect, there is provided a towing apparatus for a bus, which includes a towing bracket coupled to protrude rearward from a rear end frame which is disposed to extend in a left-right direction at a rearmost lower end of a vehicle body, and a towing pin assembly which is detachably assembled with the towing bracket and to which a towing mechanism provided in a towing vehicle is caught and coupled.

The towing apparatus may further include an upper reinforcement bracket coupled to connect a top surface of the rear end frame to a top surface of the towing bracket.

The towing apparatus may further include a lower reinforcement bracket coupled to connect a bottom surface of the rear end frame to a bottom surface of the towing bracket.

The towing bracket may be coupled to protrude from a rear side surface of a rear end frame in a horizontal direction or an upward direction.

The towing bracket may include a base surface coupled to be in surface contact with a rear side surface of the rear end frame, and an upper surface and a lower surface which are formed to extend rearward from an upper end and a lower end of the base surface.

The towing apparatus may further include a pair of vertical reinforcement brackets disposed to be spaced apart from each other on the base surface in a left-right direction and coupled to connect the base surface to the upper surface and the lower surface.

The upper reinforcement bracket may be coupled to partially or fully cover a top surface of the upper surface of the towing bracket, and the lower reinforcement bracket may be coupled to partially or fully cover a bottom surface of the lower surface of the towing bracket.

The towing pin assembly may be assembled by vertically passing through the upper reinforcement bracket, the towing bracket, and the lower reinforcement bracket at a position behind the rear end frame, and the towing mechanism may be coupled by being caught to a portion located in the towing bracket of the towing pin assembly.

The towing pin assembly may include a towing pin fully passing through the upper reinforcement bracket, the upper surface and the lower surface of the towing bracket, and the lower reinforcement bracket, a fixing clip assembled by passing through a lower end portion of the towing pin protruding downward from the lower reinforcement bracket, and a wire connecting an upper end portion of the towing pin to the fixing clip.

The towing mechanism may include either a tow hook or a tow band.

According to another aspect, there is provided a towing apparatus for a bus, which includes a towing bracket coupled to be in surface contact with a rear side surface of a rear end frame constituting a vehicle body and coupled to only protrude rearward from the rear end frame, and a towing pin assembly assembled with the towing bracket by vertically passing through a portion protruding from the towing bracket to a rear side of the rear end frame and coupled to a towing mechanism provided in a towing vehicle by being caught to the towing mechanism, wherein the towing mechanism may be coupled by being caught to a portion located in the towing bracket of the towing pin assembly.

BRIEF DESCRIPTION OF THE DRAWINGS

The above and other objects, features and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Hereinafter, a towing apparatus for a bus according to exemplary embodiments of the present disclosure will be described with reference to the accompanying drawings.

As shown in FIGS. 1 to 5, a towing apparatus 1 for a bus according to embodiments of the present disclosure includes a towing bracket 100 coupled to a rear end frame 10, which is disposed to extend from a lower end of a vehicle body at a rearmost side in a left-right direction, to only protrude rearward from the rear end frame 10, and a towing pin assembly 200 detachably assembled to the towing bracket 100 and coupled to a towing mechanism 20, which is provided in a towing vehicle, by being caught to the towing mechanism 20.

The towing bracket 100 is installed in a structure in which the towing bracket 100 is coupled to protrude from a rear side surface 11 of the rear end frame 10 to only a rear side thereof and does not protrude downward from the rear end frame 10.

The rear end frame 10 constituting a vehicle body of a bus is installed in a structure in which the rear end frame 10 is located at a lower end of the vehicle body at a rearmost side thereof and disposed to extend in a left-right direction, and two left and right sides of the rear end frame 10 are coupled to a rear side frame constituting the vehicle body.

Figure 3:
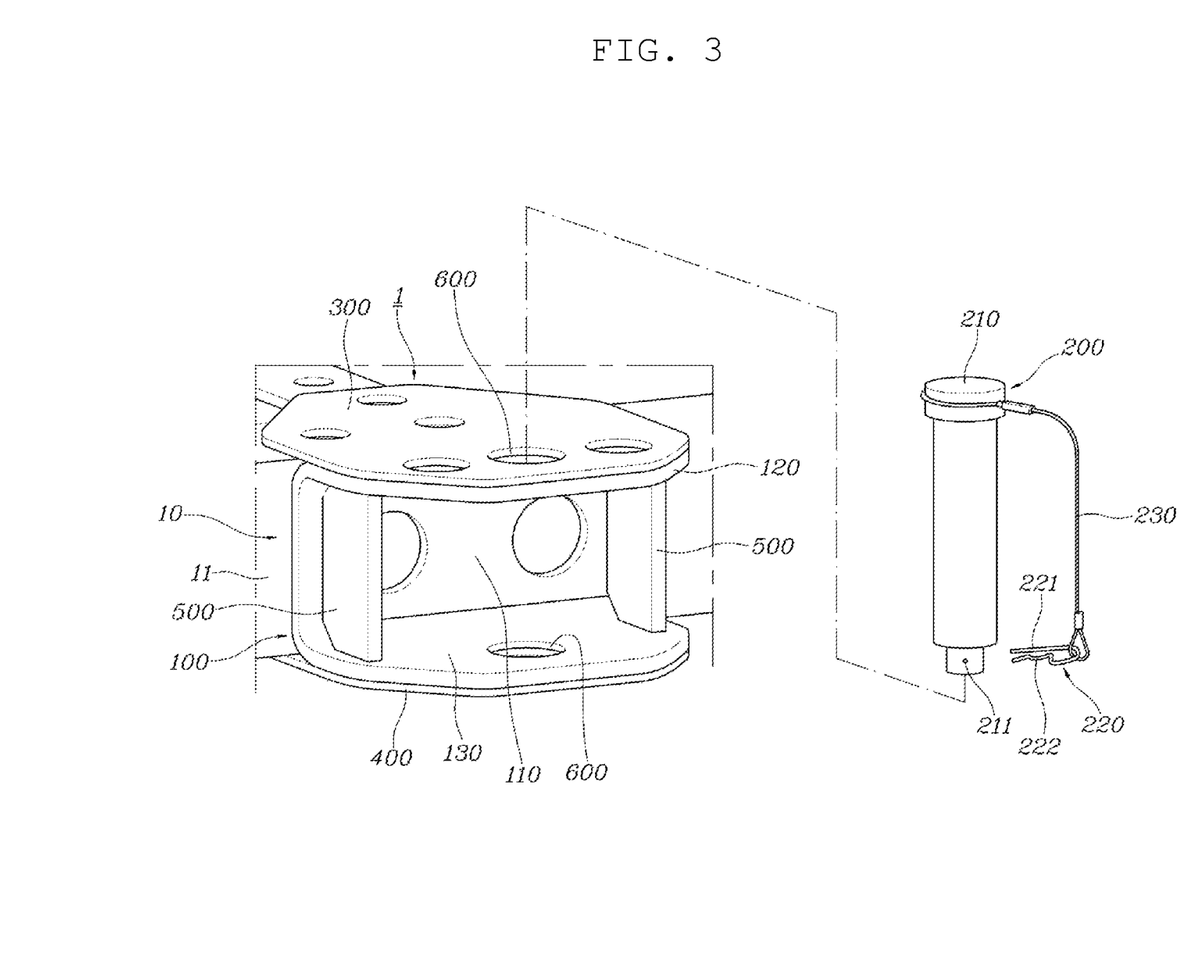
FIG. 3 is an exploded perspective view illustrating a towing bracket and a towing pin assembly which constitute the towing apparatus according to embodiments of the present disclosure.

The towing bracket 100 includes a base surface 110 in surface contact with the rear side surface 11 of the rear end frame 10 and coupled thereto by welding, and an upper surface 120 and a lower surface 130 which are formed to extend rearward from an upper end and a lower end of the base surface 110.

The base surface 110, the upper surface 120, and the lower surface 130 are formed such that an outer shape is connected in a U shape. Since the base surface 110 is in surface contact with the rear side surface 11 of the rear end frame 10 and is coupled thereto by welding, the upper surface 120 and the lower surface 130 of the towing bracket 100 are installed in a structure in which the upper surface 120 and the lower surface 130 are installed to protrude rearward from the vehicle based on the rear side surface 11 of the rear end frame 10 and do not protrude downward from the rear end frame 10.

The towing bracket 100 may be coupled to protrude from the rear side surface 11 of the rear end frame 10 in a horizontal direction or an upward direction.

Figure 1:
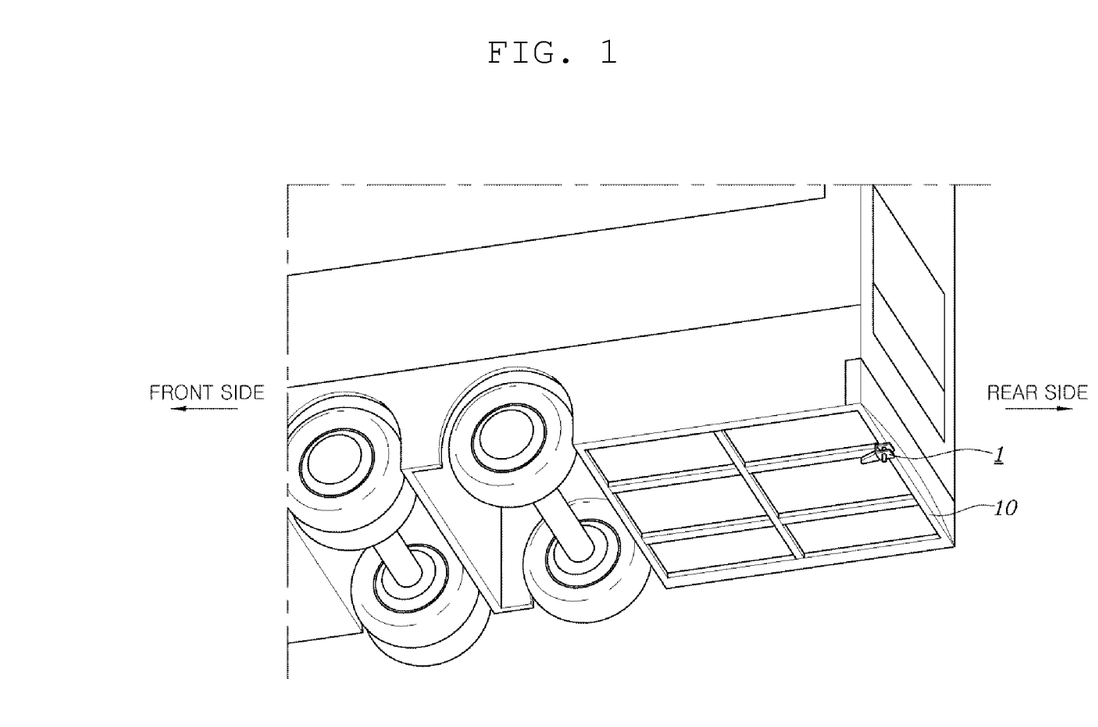
FIG. 1 is a bottom perspective view illustrating a bus to which a towing apparatus is coupled according to embodiments of the present disclosure.
Figure 2:
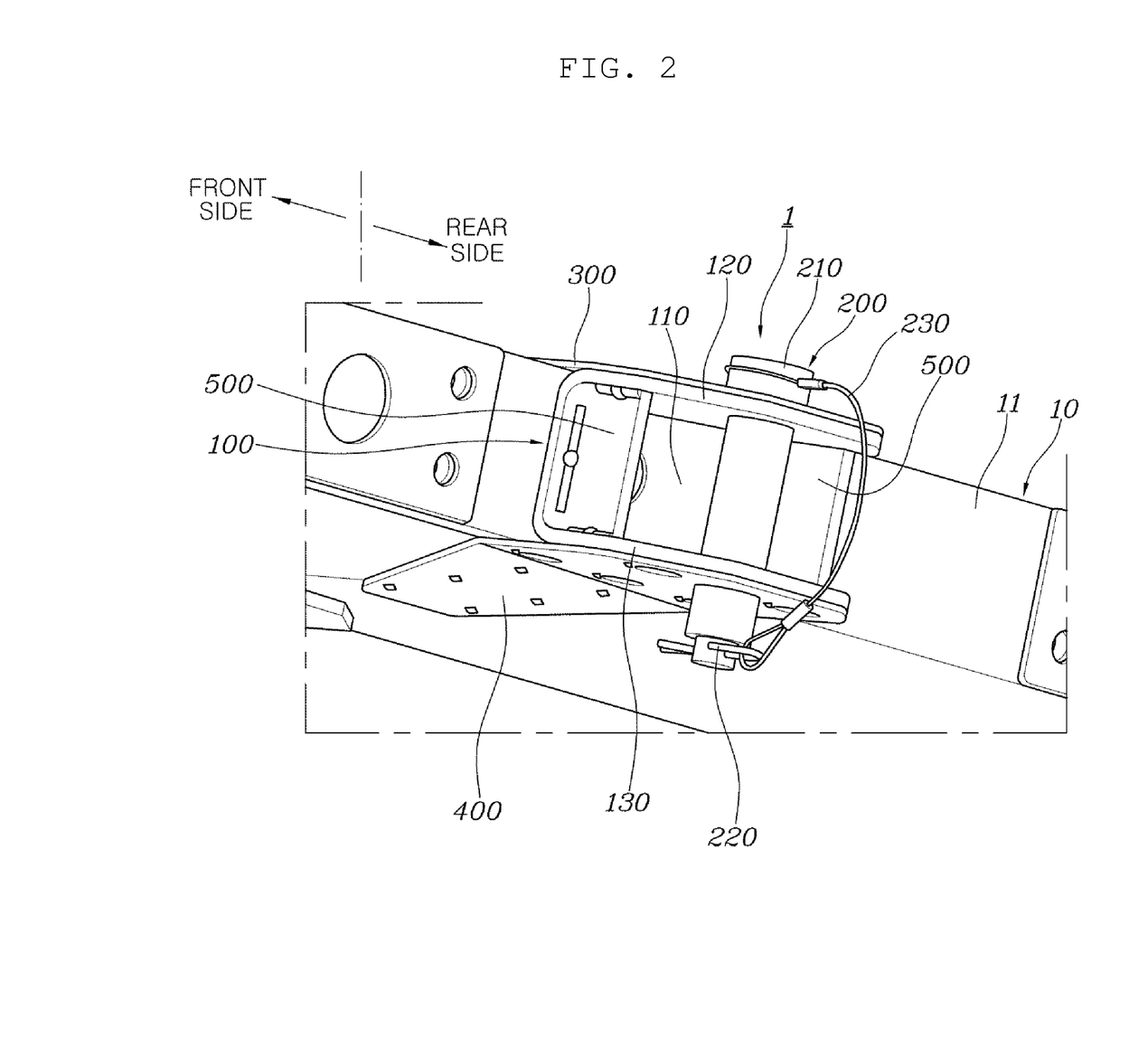
FIG. 2 is a perspective view illustrating a portion at which the towing apparatus for a bus is coupled according to embodiments of the present disclosure.

An embodiment of the present disclosure further includes an upper reinforcement bracket 300 coupled to connect a top surface of the rear end frame 10 to a top surface of the upper surface 120 of the towing bracket 100, and a lower reinforcement bracket 400 coupled to connect a bottom surface of the rear end frame 10 to a bottom surface of the lower surface 130 of the towing bracket 100.

The upper reinforcement bracket 300 and the lower reinforcement bracket 400 are coupled by welding so that strength and rigidity of the towing bracket 100 in a vertical direction may be significantly improved due to the upper reinforcement bracket 300 and the lower reinforcement bracket 400.

The upper reinforcement bracket 300 may be coupled to partially or fully cover a top surface of the upper surface 120 of the towing bracket 100, and the lower reinforcement bracket 400 may be coupled to partially or fully cover a bottom surface of the lower surface 130 of the towing bracket 100.

As shown in the drawings, an embodiment according to the present disclosure basically includes a configuration in which the upper reinforcement bracket 300 is coupled to fully cover the top surface of the upper surface 120 of the towing bracket 100, and a configuration in which the lower reinforcement bracket 400 is coupled to fully cover the bottom surface of the lower surface 130 of the towing bracket 100.

In addition, the embodiment according to the present disclosure further includes a pair of vertical reinforcement brackets 500 located on the base surface 110 of the towing bracket 100, spaced apart from each other in the left-right direction, and coupled to connect the base surface 110, the upper surface 120, and the lower surface 130.

The vertical reinforcement bracket 500 is formed in a flat plate shape, and an outer circumferential surface of the vertical reinforcement bracket 500 is coupled to the base surface 110, the upper surface 120, and the lower surface 130 of the towing bracket 100 by welding.

Owing to the pair of vertical reinforcement brackets 500 coupled to be spaced apart from each other in the left-right direction, there is an effect in that strength and rigidity of the towing bracket 100 in the vertical direction are significantly improved as well as strength and rigidity thereof in the left-right direction are also significantly improved.

The towing bracket 100 is blocked in the vertical direction by the upper surface 120 and the lower surface 130 which protrude rearward and is also blocked in the left-right direction by the pair of vertical reinforcement brackets 500 coupled to be spaced apart from each other in the left-right direction. Consequently, the towing bracket 100 has a structure which is open to only the rear side.

The towing pin assembly 200 is assembled by vertically passing through the upper reinforcement bracket 300, the towing bracket 100, and the lower reinforcement bracket 400 at a position behind the rear end frame 10, and the towing mechanism 20 is caught and coupled to a portion of the towing pin assembly 200 located in the towing bracket 100.

That is, a structure for towing is provided such that the towing vehicle is located at a position behind the rear end frame 10, the towing mechanism 20 provided in the towing vehicle is drawn forward, and the towing mechanism 20 of the towing vehicle, which is drawn forward, is inserted into the towing bracket 100 through the open rear side thereof and then coupled to the towing pin assembly 200 by being caught thereto.

For towing, a rear bumper is removed and then a towing operation is performed, and, after the towing operation is performed, the removed rear bumper may be reassembled and used.

The towing pin assembly 200 according to embodiments of the present disclosure includes a towing pin 210 fully passing through the upper reinforcement bracket 300, the upper surface 120 and the lower surface 130 of the towing bracket 100, and the lower reinforcement bracket 400, a fixing clip 220 assembled by passing through a lower end portion of the towing pin 210 protruding downward from the lower reinforcement bracket 400, and a wire 230 connecting an upper end portion of the towing pin 210 to the fixing clip 220.

The towing pin 210 may be assembled by vertically passing through the upper surface 120 and the lower surface 130 of the towing bracket 100. When the upper reinforcement bracket 300 and the lower reinforcement bracket 400 fully cover the upper surface 120 and the lower surface 130 of the towing bracket 100, the towing pin 210 may be assembled by sequentially passing through the upper reinforcement bracket 300, the upper surface 120 and the lower surface 130 of the towing bracket 100, and the lower reinforcement bracket 400.

The towing pin 210 sequentially passing through the upper reinforcement bracket 300, the upper surface 120 and the lower surface 130 of the towing bracket 100, and the lower reinforcement bracket 400 is illustrated as an example in the drawings, and, for the passing through of the towing pin 210, a pin hole 600 is formed to vertically pass through.

An outer size of the upper end portion of the towing pin 210 is formed to be larger than a diameter of the pin hole 600, and thus a structure is provided such that the towing pin 210 is caught in the pin hole 600 to not be pulled out.

A clip hole 211 in which the fixing clip 220 is inserted to pass through is formed in the lower end portion of the towing pin 210 which passes through the lower reinforcement bracket 400 to protrude downward.

The fixing clip 220 includes a first rod 221 and a second rod 222 connected to the first rod 221.

The first rod 221 of the fixing clip 220 is formed to extend in a straight shape to pass through the clip hole 211 of the towing pin 210.

The second rod 222 of the fixing clip 220 is connected to the first rod 221 and formed to be bent a number of times. When the first rod 221 passes through the clip hole 211, the second rod 222 spreads outward to surround an outer circumferential surface of the lower end portion of the towing pin 210. In a state of surrounding the outer circumferential surface of the lower end portion of the towing pin 210, the second rod 222 serves to fix a position of the fixing clip 220 using an elastic force.

Figure 4:
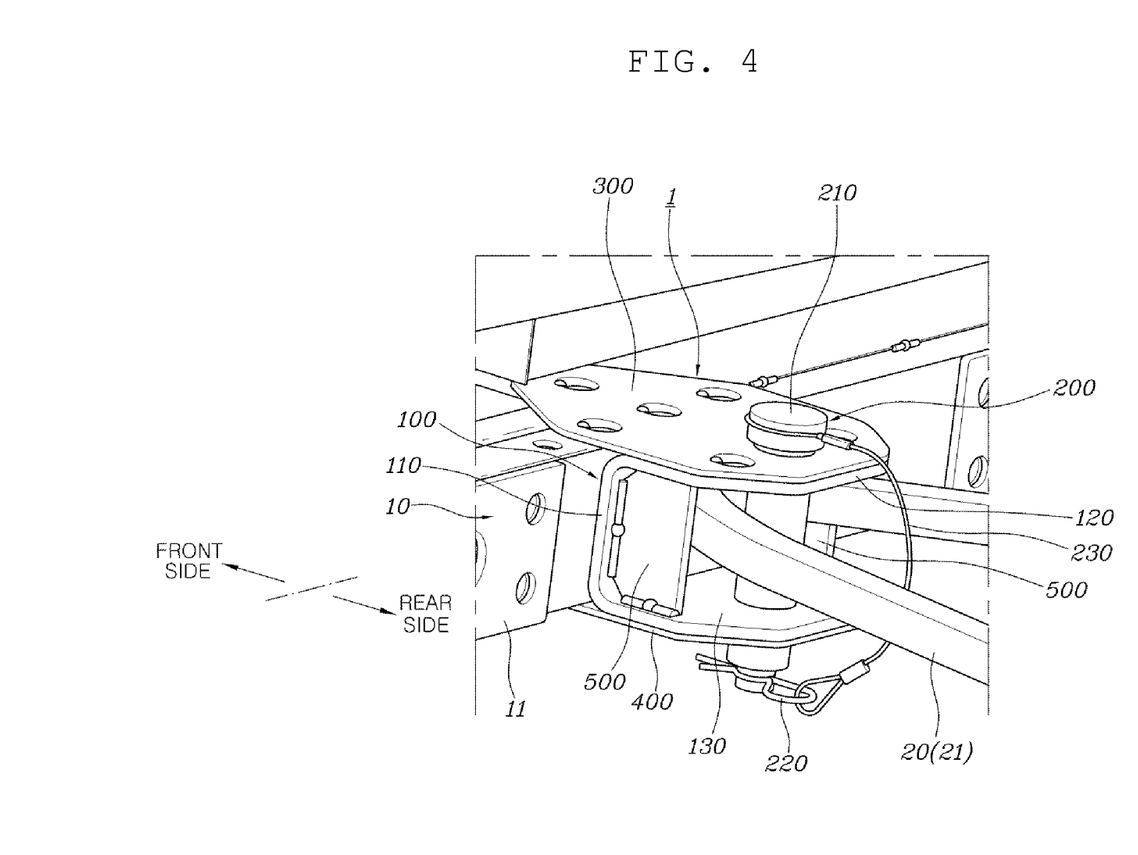
FIGS. 4 and 5 are diagrams for describing a tow band and a tow hook which are coupled to the towing pin assembly according to embodiments of the present disclosure.
Figure 5:
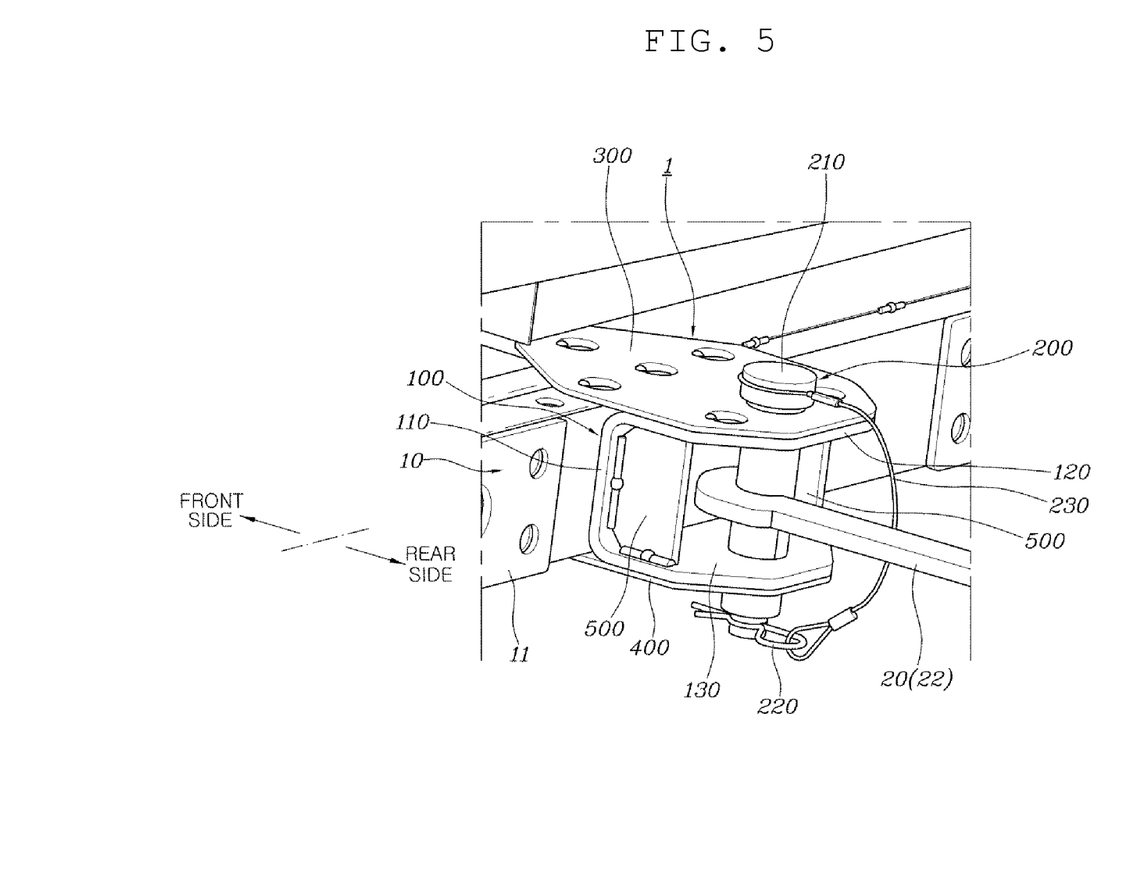

As shown in FIGS. 4 and 5, the towing mechanism 20 provided in the towing vehicle and used in the embodiments of the present disclosure may be either a tow band 21 or a tow hook 22.

When the towing mechanism 20 is used, a rear bumper is first removed from a bus which is a towing target vehicle, and the towing bracket 100 coupled to the rear side surface 11 of the rear end frame 10 is exposed to a rear side.

When the towing bracket 100 is exposed to the rear side, in a state in which the towing pin 210 is not assembled with the towing bracket 100, the tow band 21 or the tow hook 22 provided in the towing vehicle is inserted into the towing bracket 100, and the towing pin 210 is finally assembled with the towing bracket 100 so that the tow band 21 or the tow hook 22 is coupled to be caught to the towing pin 210.

When the towing mechanism 20 is the tow band 21, the tow band 21 is first inserted into the towing bracket 100 with which the towing pin 210 is not assembled, and then the towing pin 210 is assembled with the towing bracket 100 so that the tow band 21 may be coupled to the towing pin 210 by being caught thereto. When the towing mechanism 20 is the tow hook 22, the tow hook 22 is inserted into the towing bracket 100 in a state in which the towing pin 210 is assembled with the towing bracket 100 so that the tow hook 22 may be coupled to the towing pin 210 by being caught thereto.

As described above, in the towing apparatus for a bus according to embodiments of the present disclosure, the towing bracket 100 is coupled to the rear side surface 11 of the rear end frame 10. The towing bracket 100 has a configuration in which the towing bracket 100 is coupled to only protrude rearward from the rear end frame 10 without protruding downward from the rear end frame 10, and the towing mechanism 20 provided in the towing vehicle is inserted into the towing bracket 100 to be caught and coupled to the towing pin assembly 200 coupled to the towing bracket 100. When the bus crosses a bump or enters a hilly road during driving, the towing bracket 100 and the towing pin assembly 200 are prevented from coming into contact with the ground so that enhancement of a coupling force between the towing apparatus 1 and the vehicle body may be achieved, and particularly, there is an advantage of preventing damage to the towing apparatus 1 and improving ride comfort of a passenger.

In addition, in the towing apparatus 1 according to embodiments of the present disclosure, owing to the pair of vertical reinforcement brackets 500 coupled to the upper reinforcement bracket 300, the lower reinforcement bracket 400, and the towing bracket 100 which are coupled to connect the rear end frame 10 to the towing bracket 100, it is possible to significantly improve overall strength and rigidity of the towing apparatus 1 so that there is an advantage in that it is possible to secure a stable towing force and achieve improvement of durability.

In accordance with a towing apparatus for a bus according to embodiments of the present disclosure, a configuration is provided such that a towing bracket is coupled to a rear side surface of a rear end frame, and the towing bracket is coupled to only protrude rearward from the rear end frame without protruding downward from the rear end frame, and a towing mechanism provided in a towing vehicle is inserted into the towing bracket to be coupled to a towing pin assembly, which is coupled to the towing bracket, by being caught to the towing pin assembly. Thus, when a bus crosses a bump or enters a hilly road during driving, the towing bracket and the towing pin assembly can be prevented from coming into contact with the ground so that it is possible to achieve enhancement of a coupling force between a towing device and a vehicle body, and particularly, there is an effect which is capable of preventing damage to the towing device and achieving improvement of ride comfort of a passenger.

In addition, in the towing apparatus according to embodiments of the present disclosure, owing to an upper reinforcement bracket, a lower reinforcement bracket, and a pair of vertical reinforcement brackets, which are coupled to connect the rear end frame to the towing bracket, it is possible to significantly improve overall strength and rigidity of the towing apparatus so that there is an effect which is capable of securing a stable towing force and achieving improvement of durability.

Although specific embodiments of the present disclosure has been described and illustrated, those skilled in the art will appreciate that various alternations and modifications are possible without departing from the technical spirit of the present disclosure as disclosed in the appended claims.

What is claimed is:

1. A towing apparatus, comprising:
   a towing bracket configured to protrude rearward from a rear end frame which is disposed to extend in a left-right direction at a rearmost lower end of a vehicle body;
   a towing pin assembly which is detachably assembled with the towing bracket and to which a towing mechanism provided in a towing vehicle is to be caught and coupled;
   an upper reinforcement bracket coupled to connect a top surface of the rear end frame to a top surface of the towing bracket; and
   a lower reinforcement bracket coupled to connect a bottom surface of the rear end frame to a bottom surface of the towing bracket, wherein the towing bracket includes:
      a base plate coupled to be in surface contact with a rear side surface of the rear end frame;
      an upper plate which is formed to extend rearward from an upper end of the base plate and disposed below the upper reinforcement bracket; and
      a lower plate which is formed to extend rearward from a lower end of the base plate and disposed above the lower reinforcement bracket.

2. The towing apparatus of claim 1, wherein the towing bracket is coupled to protrude from a rear side surface of the rear end frame in a horizontal direction or an upward direction.

3. The towing apparatus of claim 1, further comprising a pair of vertical reinforcement brackets disposed to be spaced apart from each other on the base plate in a left-right direction and coupled to connect the base plate to the upper plate and the lower plate.

4. The towing apparatus of claim 1, wherein:
   the upper reinforcement bracket is coupled to at least partially cover a top surface of the upper surface of the towing bracket; and
   the lower reinforcement bracket is coupled to at least partially cover a bottom surface of the lower surface of the towing bracket.

5. The towing apparatus of claim 1, wherein:
   the towing pin assembly is assembled by vertically passing through the upper reinforcement bracket, the towing bracket, and the lower reinforcement bracket at a position behind the rear end frame; and
   the towing mechanism is coupled by being caught to a portion located in the towing bracket of the towing pin assembly.

6. The towing apparatus of claim 1, wherein the towing pin assembly includes:
   a towing pin fully passing through the upper reinforcement bracket, the upper plate and the lower plate of the towing bracket, and the lower reinforcement bracket;
   a fixing clip assembled by passing through a lower end portion of the towing pin protruding downward from the lower reinforcement bracket; and
   a wire connecting an upper end portion of the towing pin to the fixing clip.

7. The towing apparatus of claim 1, wherein the towing mechanism includes a tow hook or a tow band.

8. A towing apparatus, comprising:
   a towing bracket coupled to be in surface contact with a rear side surface of a rear end frame constituting a vehicle body and coupled to protrude toward only a rear side of the rear end frame; and
   a towing pin assembly assembled with the towing bracket by vertically passing through a portion protruding from the towing bracket to a rear side of the rear end frame and configured to be caught and coupled to a towing mechanism provided in a towing vehicle,
   wherein the towing mechanism is configured to be coupled by being caught to a portion located in the towing bracket of the towing pin assembly;
   an upper reinforcement bracket coupled to connect a top surface of the rear end frame to a top surface of the towing bracket; and
   a lower reinforcement bracket coupled to connect a bottom surface of the rear end frame to a bottom surface of the towing bracket;
   wherein the towing bracket includes:
      a base plate coupled to be in surface contact with a rear side surface of the rear end frame; and
      an upper plate which is formed to extend rearward from an upper end of the base plate and disposed below the upper reinforcement bracket; and
      a lower plate which is formed to extend rearward from a lower end of the base plate and disposed above the lower reinforcement bracket.

9. The towing apparatus of claim 8, wherein the towing bracket is coupled to protrude from the rear side surface of the rear end frame in a horizontal direction or an upward direction.

10. The towing apparatus of claim 8, further comprising a pair of vertical reinforcement brackets disposed to be spaced apart from each other on the base plate in a left-right direction and coupled to connect the base surface to the upper plate and the lower plate.

11. The towing apparatus of claim 8, wherein:
    the upper reinforcement bracket is coupled to at least partially cover a top surface of the upper plate of the towing bracket; and
    the lower reinforcement bracket is coupled to at least partially cover a bottom surface of the lower plate of the towing bracket.

12. The towing apparatus of claim 8, wherein:
    the towing pin assembly is assembled by vertically passing through the upper reinforcement bracket, the towing bracket, and the lower reinforcement bracket at a position behind the rear end frame; and
    the towing mechanism is configured to be coupled by being caught to a portion located in the towing bracket of the towing pin assembly.

13. The towing apparatus of claim 8, wherein the towing pin assembly includes:
    a towing pin fully passing through the upper reinforcement bracket, the upper plate and the lower plate of the towing bracket, and the lower reinforcement bracket;
    a fixing clip assembled by passing through a lower end portion of the towing pin protruding downward from the lower reinforcement bracket; and
    a wire connecting an upper end portion of the towing pin to the fixing clip.

14. The towing apparatus of claim 8, wherein the towing mechanism includes a tow hook or a tow band.

15. A towing apparatus, comprising:
    a towing bracket coupled to protrude rearward from a rear end frame which is disposed to extend in a left-right direction at a rearmost lower end of a vehicle body, wherein the towing bracket includes a base plate, an upper plate, and a lower plate;
    a towing pin assembly which is detachably assembled with the towing bracket and to which a towing mechanism provided in a towing vehicle is configured to be caught and coupled, the towing mechanism including a tow hook or a tow band;

an upper reinforcement bracket coupled to connect a top surface of the rear end frame to a top surface of the towing bracket;

a lower reinforcement bracket coupled to connect a bottom surface of the rear end frame to a bottom surface of the towing bracket; and a pair of vertical reinforcement brackets disposed to be spaced apart from each other on the base surface in a left-right direction and coupled to connect the base plate to the upper plate and the lower plate;

wherein the upper plate is formed to extend rearward from an upper end of the base plate and disposed below the upper reinforcement bracket; and the lower plate is formed to extend rearward from a lower end of the base plate and disposed above the lower reinforcement bracket.

16. The towing apparatus of claim 15, wherein the towing pin assembly includes:

a towing pin fully passing through the upper reinforcement bracket, the upper plate and the lower plate of the towing bracket, and the lower reinforcement bracket;

a fixing clip assembled by passing through a lower end portion of the towing pin protruding downward from the lower reinforcement bracket; and a wire connecting an upper end portion of the towing pin to the fixing clip.

17. The towing apparatus of claim 15, wherein:

the upper reinforcement bracket is coupled to at least partially cover a top surface of the upper surface of the towing bracket; and the lower reinforcement bracket is coupled to at least partially cover a bottom surface of the lower surface of the towing bracket.

18. The towing apparatus of claim 15, wherein the towing pin assembly is assembled by vertically passing through the upper reinforcement bracket, the towing bracket, and the lower reinforcement bracket at a position behind the rear end frame.

19. The towing apparatus of claim 18, wherein the towing mechanism is coupled by being caught to a portion located in the towing bracket of the towing pin assembly.

20. The towing apparatus of claim 15, wherein the towing mechanism includes a tow hook or a tow band.

* * * * *